United States Patent [19]

Oaks

[11] Patent Number: 4,911,591

[45] Date of Patent: Mar. 27, 1990

[54] FASTENER AND METHOD OF ATTACHMENT TO SHEET MATERIAL

[76] Inventor: Daniel V. Oaks, 2734 Ronald, Troy, Mich. 48098

[21] Appl. No.: 217,131

[22] Filed: Jun. 29, 1988

Related U.S. Application Data

[63] Continuation of Ser. No. 30,246, Mar. 24, 1987, abandoned, which is a continuation of Ser. No. 757,338, Jul. 22, 1985, abandoned, which is a continuation-in-part of Ser. No. 714,998, Mar. 22, 1985, abandoned, which is a continuation of Ser. No. 414,555, Sep. 3, 1982, abandoned.

[51] Int. Cl.⁴ ............................................. F16B 37/04
[52] U.S. Cl. ..................... 411/177; 411/103
[58] Field of Search ............... 411/166, 176, 177, 179, 411/180, 181, 183, 184, 427, 103; 29/21.1, 521, 432

[56] References Cited

U.S. PATENT DOCUMENTS

| | | | |
|---|---|---|---|
| 2,229,565 | 1/1941 | Hallowell, Jr. | 411/403 |
| 2,233,242 | 2/1941 | Burke | 411/181 |
| 2,254,558 | 9/1941 | Williams | 29/432 X |
| 2,451,991 | 10/1948 | Swanstrom | 411/103 |
| 3,187,424 | 6/1965 | Double et al. | 411/181 X |
| 3,189,076 | 6/1965 | Adams | 411/113 |
| 3,259,166 | 7/1966 | Hernadi | 411/85 X |
| 3,299,500 | 1/1967 | Double | 411/179 X |
| 3,315,345 | 4/1967 | Double et al. | 29/21.1 X |
| 3,824,675 | 7/1974 | Ballantyne | 411/179 X |
| 3,900,937 | 8/1975 | Schleicher | 29/521 X |
| 3,922,770 | 12/1975 | Ladouceur | 411/179 X |
| 3,926,236 | 12/1975 | Pouch et al. | 411/179 |
| 4,059,897 | 11/1977 | Marquis | 29/521 X |
| 4,186,787 | 2/1980 | Husain | 411/183 |
| 4,237,567 | 12/1980 | Grube | 411/179 X |
| 4,557,651 | 12/1985 | Peterson | 411/180 |

FOREIGN PATENT DOCUMENTS

| | | | |
|---|---|---|---|
| 112339 | 1/1941 | Australia | 411/427 |
| 1047545 | 11/1966 | United Kingdom | 411/177 |

Primary Examiner—Rodney M. Lindsey
Attorney, Agent, or Firm—Remy J. Van Ophem

[57] ABSTRACT

An improved fastener and method of attachment to sheet material providing attachment of a tubular fastener to sheet material by extruding, without severing, portions of the sheet material completely through openings on the base portion of the fastener. The extruded material is clinched on the top surface of the base portion by clinch members integrally formed with the base portion. The fastener is internally threaded, lightweight and preferably heat-treated prior to attachment to the sheet material to provide fastener strength equivalent to or greater than that of much heavier nuts. Two types of such fasteners may be attached by a method which opens up a hole in the sheet material of a larger diameter than the major diameter of the threads in the fasteners while simultaneously clinching the fastener in place. This eliminates the need to use thread-cutting bolts. The fasteners may be connected together to form a strip to be fed into an automated assembly unit from a dispenser.

12 Claims, 3 Drawing Sheets

FASTENER AND METHOD OF ATTACHMENT TO SHEET MATERIAL

CROSS-REFERENCE TO RELATED APPLICATIONS

This application is a continuation application of my prior application U.S. Ser. No. 07/030,246 filed on Mar. 24, 1987 which was a continuation of Ser. No. 06/757,338 filed July 22, 1985 which was a continuation-in-part of Ser. No. 06/714,998 filed Mar. 22, 1985 which was a continuation of Ser. No. 06/414,555 filed Sept. 3, 1982 now all abandoned.

BACKGROUND OF THE INVENTION

1. Field of the Invention

This invention relates to fasteners and, in particular, to tubular fasteners and methods of attachment to sheet metal panels and certain co-polymer and plastic panels.

2. Description of the Prior Art

In the manufacture of automotive products it is often necessary to provide means to join component parts, one of which is a panel, by the use of threaded fasteners. Bolts or screws are commonly threaded into suitable nuts secured to the panel. The prior art in fasteners and methods of attachment encompass weld nuts, cage nuts, clinch nuts and pierce clinch nuts. They are attached by welding or by a variety of mechanically clinched, extruded, or swaged techniques whereby the nut body or a portion thereof, co-operating with a die member, effects an attachment.

Clinch nuts are most commonly attached to sheet material by one of two methods. In the first method the nuts are punched through the sheet material, clinching the nut around the periphery of the hole punched out by the nut. Using this method of attachment reduces the load bearing surface area of the nut abutting against the sheet material. When power tools are used to insert a bolt or screw into the attached nut, there is a tendency to dislodge the nut from the panel because of the low push-off strength of these fasteners.

In the second method, the nuts are clinched onto the surface of the sheet material while simultaneously having a punch in the bore of the nut punch out a slug in the sheet material. This method of attachment offers an increased area of load bearing surface abutting against the sheet material. It also necessitates the use of a thread cutting bolt with the fastener, because the diameter of the punch in the bore of the nut cannot be larger than the minor diameter of the threaded bore. The use of thread cutting bolts is shown to Pouch et al by the U.S. Pat. Nos. 3,829,957 and 3,926,236 and Russian Patent No. 506,317. The use of thread-cutting bolts, however, reduces the success of the nut because of the relatively low push-off strength it exhibits. Also, the use of such bolts is more costly and it is more difficult to control tolerances of the fastener.

In either method, the nuts are relatively heavy, making their use undesirable in automotive assembly where there has been a effort to reduce weight to increase fuel economy. With the quest for lighter weight vehicles, thinner sheet panels are being used. Inadequate pull-through strength has been cited as a weakness of clinch and pierce and clinch type fasteners.

The prior art patents of Schleicher U.S. Pat. No. 3,900,937; Marquis U.S. Pat. No. 4,059,897; Williams U.S. Pat. No. 2,254,558; Double U.S. Pat. No. 3,299,500; Double et al U.S. Pat. No. 3,315,345; Grube U.S. Pat. No. 3,704,507; and Steward U.S. Pat. No. 3,878,598 all teach means of attachment wherein first a panel of material is severed by punching, shearing, or lancing and then a nut body is deformed However, any fastener attachment which causes the panel material to be severed increases the potential for seepage of corrosive liquids through the severed panel.

Barrel-type, clip-on fasteners have been used as a lightweight, low-cost alternative to clinch nuts. The present clip-on mounting method of these fasteners, however, restricts their application to holes near the edge of the sheet material. Furthermore, the clip-on mounting method does not provide as secure a mount as the clinch nuts.

SUMMARY OF THE INVENTION

An object of the present invention is to provide a lightweight fastener which is equal in strength to current fasteners and which lends itself to a simple fastening operation for securing it to sheet metal panels and certain co-polymers and plastic panels.

Another object of the present invention is to provide a nut-type fastener which is adapted for assembly to sheet panels of varying thicknesses without the need of prior panel preparation (i.e. pre-drilled or punched holes, clips or formed tabs etc).

Still another object of the present invention is to provide a fastening method which does not rely upon moving tool members to sever, lance or deform the fastener to effect an attachment.

In carrying out the above object and other objects of the invention, a fastener for attachment to sheet material includes a base portion having top and bottom surfaces, the bottom surface being adapted to abut against the sheet material. The base portion includes a pair of spaced clinch members integrally formed with the base portion. Each of the clinch members are displaced from the rest of the base portion to define a clinch opening in the bottom surface thereof and an extrusion opening in the top surface thereof in fluid communication with its clinch opening. The fastener further includes a tubular attachment portion integrally formed with the base portion between the clinch members and adapted for attachment to a separate fastener. The clinch and extrusion openings permit portions of the sheet material to be extruded therethrough the openings, the clinch members clinching the extruded sheet material to the base portion at the top surface of the base portion.

Further in carrying out the above objects and other objects of the present invention, a method for attaching such a fastener to sheet material includes the steps of placing the fastener on the sheet material so that the bottom surface of the base portion abuts the sheet material, and punching out a slug of sheet material to leave a hole in the sheet material, the hole having its center on a line forming a vertical axis of the tubular attachment portion. The method also includes the step of extruding portions of the sheet material surrounding the hole into the clinch openings and through the openings substantially simultaneous with the step of punching to effect an attachment of the fastener to the sheet material at the top surface of the base portion without severing the portions of sheet material In one embodiment of the fastener, a neck region is contained within its tubular portion. The fastener is attached to sheet material by placing the sheet material and the fastener in a die and compressing the die. As the die is compressed a punch in the bore of the tubular portion punches out a slug of sheet material. The sheet material is then pressed or flanged upwardly by the die against the surface of the neck region while portions of the sheet material are simultaneously extruded through the clinch members without severing the portions of sheet material surrounding the hole.

One result of this method of attachment is to create a seal between the surface of the neck region and the sheet material to which the fastener is attached. The seal is important in the area of corrosion protection by preventing liquid seepage.

This method also creates a bolt hole in the sheet material which is larger in diameter than the major diameter of a threaded region of the tubular portion, making use of thread-cutting bolts with the fastener unnecessary.

The fastener may be heat treated to increase its strength. The relatively large load bearing area of its base also serves to increase its strength in use.

To facilitate its use in automated assembly, the fastener may be connected with other fasteners in a strip. This allows the fasteners to be fed into an automated assembly unit from a dispenser, such as a spool feeder.

BEST MODE FOR CARRYING OUT THE INVENTION

Referring to FIGS. 1-6 and FIGS. 11 and 12, it will be seen that each of the fasteners designated generally at 2, 4 and 5 has a base 6 with a top surface 8 and a bottom surface 10. The base has upwardly extending, spaced clinch members 12 and a tubular portion 14 therebetween.

The tubular portion 14 has a threaded region 16 for engaging bolts or screws. The tubular portion 14 of each of the fasteners 2 and 5 has a neck region 18 of a substantially constant diameter which extends upwardly from the base 6 to a taper region 20.

Figure 5:
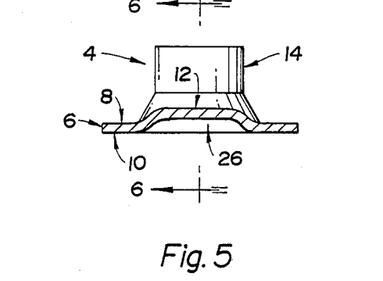
FIG. 5 is a sectional view taken along lines 5—5 of FIG. 4 of the fastener.
Figure 6:
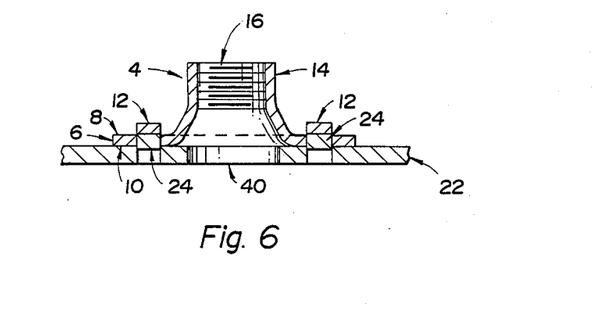
FIG. 6 is a sectional view of the second embodiment of the fastener attached to sheet material taken along line 6—6 of FIG. 5.
Figure 11:
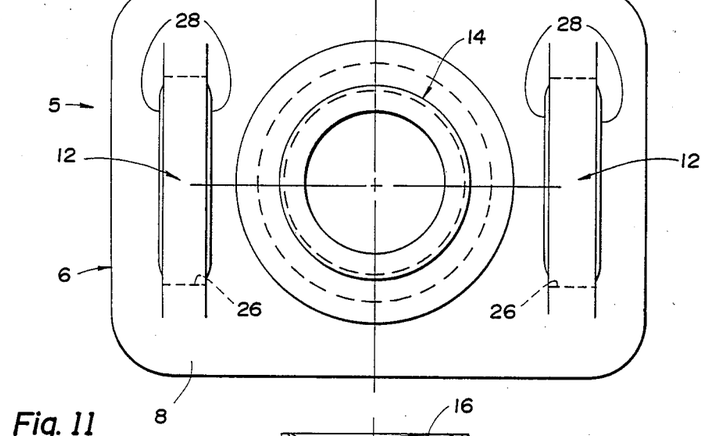
FIG. 11 is a top plan view of a third and preferred embodiment of the fastener attached to sheet material.
Figure 13:
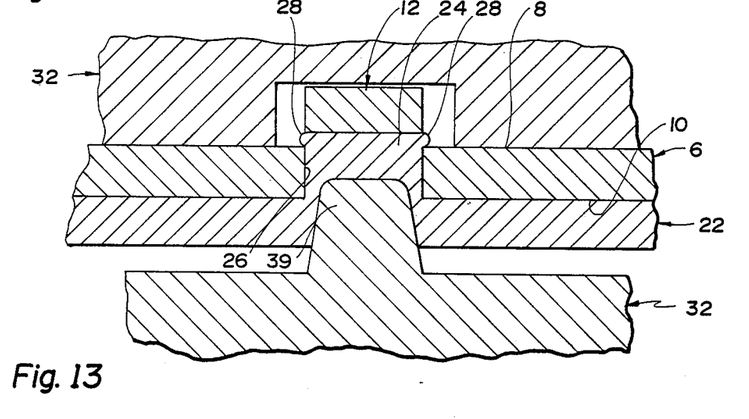
FIG. 13 is an enlarged, partially broken away, sectional view of sheet material and the preferred fastener in a die after compression to effect attachment of the fastener to the sheet material.

To attach each of the fasteners 2, 4 and 5 to the sheet material 22, portions 24 of the sheet material 22 are forced into clinch member openings 26 each terminating in two peripheral transition segment portions 26a as shown in FIG. 5 and 11. As the portions 24 of sheet material 22 continue to be forced into the clinch member openings 26 they contact the clinch members 12. Continued pressure on the portions 24 of sheet material 22 causes the portions 24 to be extruded through the clinch members 12 at extrusion points 28. These extrusions effect an attachment of each of the fasteners 2, 4 and 5 to the sheet material 22. As shown in FIG. 13, the extrusion is accomplished without perforating or severing the sheet material 22.

Figure 9:
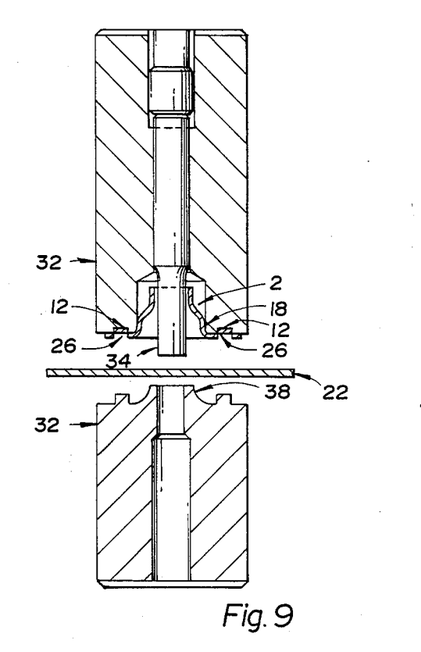
FIG. 9 is a sectional view of one such fastener and sheet material positioned in a die in preparation for attachment.
Figure 10:
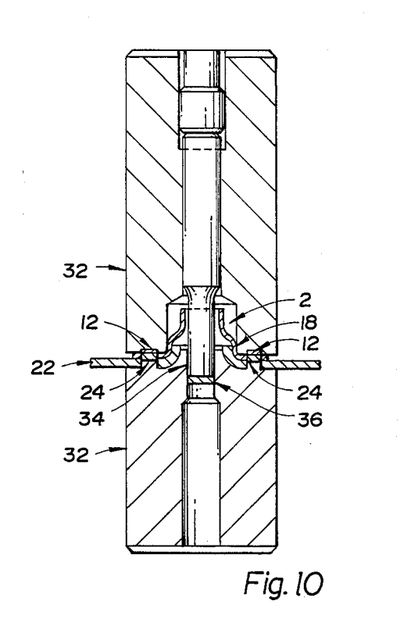
FIG. 10 is a sectional view of such a fastener and the sheet material in the die after compression to effect attachment of the fastener to the sheet material.

FIGS. 9 and 10 show a method of attaching each of the fasteners 2, 4 and 5 with neck regions 18 to the sheet material 22 while forming bolt holes 30 in a single operation. One of the fasteners is placed with the sheet material 22 in a die 32 as shown in FIG. 9. Then the die 32 is compressed as shown in FIG. 10. Compression of the die 32 first causes a bore punch 34 of the die 32 to punch out a slug 36 of sheet material. As the die 32 is further compressed, the sheet material 22 in the area of the hole left by the slug 36 is pressed against the surface of the neck region 18 by a die ring 38 of the die 32. At the same time, the sheet material portions 24 are simultaneously extruded through the clinch members 12.

Preferably, the sheet material portions 24 are extruded through the clinch members 12 by trapezoidal-shaped extrusion members 39 (only one of which is shown) formed on the die 32 as best shown in FIG. 13.

Figure 1:
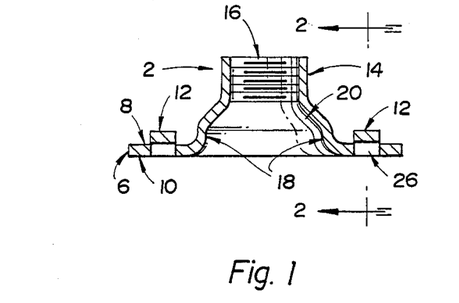
FIG. 1 is a sectional view, taken along lines 1—1 of FIG. 2, of a first embodiment of a fastener constructed in accordance with the present invention.
Figure 2:
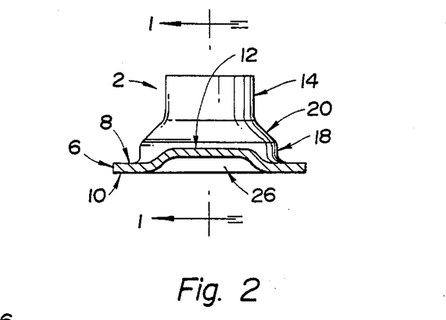
FIG. 2 is a sectional view taken along lines 2—2 of FIG. 1 of the fastener.
Figure 3:
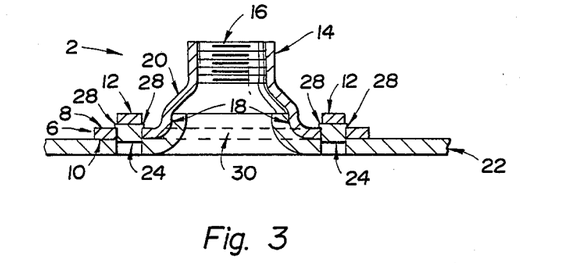
FIG. 3 is a sectional view of the fastener attached to sheet material.
Figure 12:
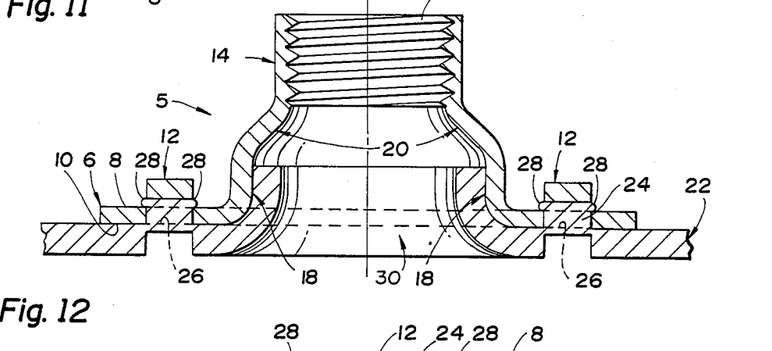
FIG. 12 is a sectional view of the fastener and attached sheet material of FIG. 11.

The resulting configuration of the attached fastener 2 and sheet material 22 is shown in FIG. 3. The resulting configuration of the attached fastener 5 and the sheet material 22 is shown in FIG. 12. The benefits of these configurations are twofold. First, pressing the sheet material 22 against the surface of the neck region 18 forms a tight seal between each of the fasteners 2 and 5 and the sheet material 22. Second, the diameter of each of the bolt holes 30 is larger than the major diameter of its threaded region 16, making the use of thread-cutting bolts with the fasteners unnecessary.

Figure 4:
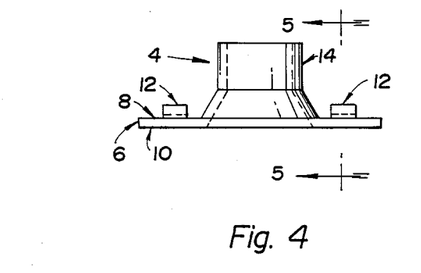
FIG. 4 is a side elevational view of a second embodiment of a fastener constructed in accordance with the present invention.

When attaching the fastener 4 to sheet material 22, the use of thread-cutting bolts is obviated by making a preformed bolt hole 40 in the sheet material 22 prior to attachment of the fastener 4. The bolt hole 40 of the fastener 4 has a larger diameter than the major diameter of the threaded region 16.

In practice, each of the fasteners 2, 4 and 5 may be made out of an annealed 1050 steel. After making each of the fasteners 2, 4 and 5, they may be heat-treated to a Rockwell hardness of 46 to 48 to increase their strength.

Figure 7:
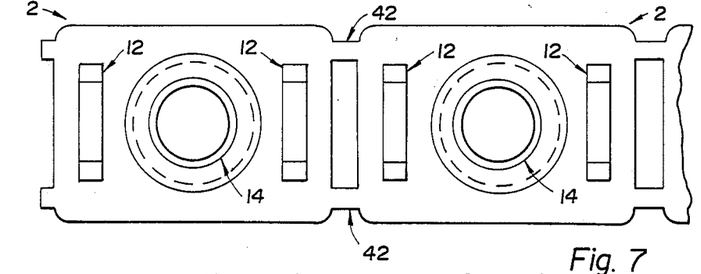
FIG. 7 is a top view of such fasteners connected together in a first strip.
Figure 8:
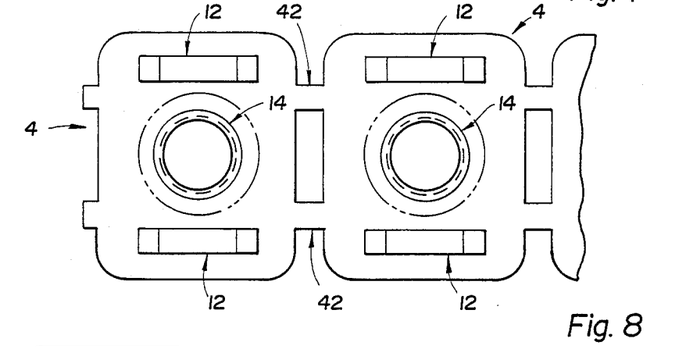
FIG. 8 is a top view of such fasteners connected together in a second strip.

Referring to FIGS. 7, 8 and 11, the relatively large surface area of the base 6 of each of the fasteners 2, 4 and 5 is shown. This feature increases the strength of the fasteners 2, 4 and 5 in actual use by providing a large load bearing area for abutment against the sheet material 22.

Also, as shown in FIGS. 7 and 8, connecting members 42 may be used to join strips of the fasteners 2, 4 and 5. The strips of fasteners 2, 4 and 5 may be fed into an automated assembly unit from a dispensing means, such as a spool feeder.

While the invention has been described in an illustrative manner, it is to be understood that the terminology which has been used is intended to be in the nature of words of description rather than of limitation. Many modifications and variations of the present invention are possible in light of the above teachings. Therefore, it is to be understood that within the scope of the appended claims, the invention may be practiced otherwise than specifically described.

What is claimed is:

1. A fastener for attaching a separate threaded fastening device thereto, said fastener being attachable to sheet material, said fastener comprising:

a base portion having a top surface, a bottom surface, and predetermined thickness therebetween, said bottom surface of said base portion being adapted to abut against said sheet material, a pair of spaced apart clinch members integrally formed with said base portion, each of said clinch members having a top surface and a bottom surface, each of said clinch members further having an outer periphery having at least two peripheral transition segment portions integral with said base portion, at least a portion of said bottom surface of each of said clinch members interposed said at least two peripheral transition segment portions being displaced from said bottom surface of said base portion such that at least a portion of said bottom surface of each of said clinch members is disposed above said bottom surface of said base portion to define a clinch opening in said bottom surface of said base portion between said at least two peripheral transition segment portions so that portions of said sheet material may be deformed into each said clinch opening in order to clinch said base portion of said fastener to said sheet material without severing or perforating said sheet material;

a tubular attachment portion integrally formed with said base portion and extending in a direction away from said top and bottom surfaces of said base portion, said tubular attachment portion further being interposed said clinch members; and threaded fastener means integrally formed with said tubular attachment portion, said threaded fastener means being adapted for attachment to said separate threaded fastening device.

2. The fastener as claimed in claim 1 wherein at least a portion of said bottom surface of each of said clinch members interposed said at least two peripheral transition segment portions is displaced in a direction away from said top and bottom surfaces of said base portion such that at least a portion of said bottom surface of each of said clinch members is disposed above said top surface of said base portion to define an extrusion opening between said top surface of said hose portion and said bottom surface of said clinch members.

3. The fastener as claimed in claim 2 wherein said threaded fastener means comprises a threaded inner surface of said tubular attachment portion for attaching said separate threaded fastening device thereto.

4. The fastener as claimed in claim 1 or claim 3 wherein said fastener is heat-treated to increase its strength.

5. The fastener as claimed in claim 3 wherein said tubular attachment portion has a first end and a second end, said second being integral with said base portion, said tubular attachment portion having a neck region extending from said first end toward said base portion, said threaded fastener means being integral with said neck region, said neck region being integral with a taper region, said taper region extending from said neck region to said second end, said threaded inner surface having a diameter smaller than that of said taper region.

6. The fastener device as claimed in claim 2 wherein said displacement of said bottom surface of each of said clinch members above said top and bottom surfaces of said base portion is such that said sheet material may be extruded through said extrusion opening without severing or perforating said sheet material.

7. A heat-treated fastener for attaching a separate threaded fastening device thereto, said heat-treated fastener being attachable to sheet material, said heat-treated fastener comprising:

a base portion having a top surface, a bottom surface, and a predetermined thickness therebetween, said bottom surface of said base portion being adapted to abut against said sheet material, a pair of mutually spaced apart clinch members integrally formed with said base portion, each of said clinch members having a top surface and a bottom surface, each of said clinch members further having an outer periphery having at least two peripheral transition segment portions integral with said base portion, at least a portion of said bottom surface of each of said clinch members interposed said at least two peripheral transition segment portions being displaced from said bottom surface of said base portion such that at least a portion of said bottom surface of each of said clinch members is disposed above said bottom surface of said base portion to define a clinch opening between said at least two peripheral transition segment portions so that a portion of said sheet material may be deformed into each said clinch opening in order to clinch said base portion of said fastener to said sheet material without severing or perforating said sheet material; and a tubular attachment portion integrally formed with said base portion between said clinch members, said tubular attachment portion having threaded fastener means integrally formed therewith, said tubular attachment portion further extending from said base portion in a direction away from said top and bottom surfaces of said base portion, said threaded fastener means comprising a threaded inner surface on said tubular attachment portion for attaching said separate threaded fastening device thereto, said tubular attachment portion further having a first and a second end, said second end being integral with said base portion, said tubular attachment portion having a neck region extending from said first end toward said base portion, said threaded fastener means being integral with said neck portion, said neck region being integral with a taper region which extends from said neck region to said second end, said threaded inner surface having a diameter smaller than that of said taper region, said taper region being adapted to abuttingly receive portions of said sheet material.

8. The fastener as claimed in claim 7 wherein at least a portion of said bottom surface of each of said clinch members interposed said at least two peripheral transition segment portions is displaced in a direction away from said top and bottom surfaces of said base portion such that at least a portion of said bottom surface of each of said clinch members is disposed above said top surface of said based portion to define an extrusion opening between said top surface of said base portion and said bottom surface of said clinch members.

9. The fastener device as claimed in claim 8 wherein said displacement of said bottom surface of each of said clinch members above said top and bottom surfaces of said base portion is such that said sheet material may be extruded through said extrusion opening without severing or perforating said sheet material.

10. A strip of fasteners, each of said fasteners being attachable to a separate threaded fastening device, each of said fasteners being attachable to a sheet material, each of said fasteners further being connected to the other fasteners of said strip of fasteners by at least one connecting member so that said strip of fasteners may be fed to an assembly unit from a dispensing means, each of said fasteners comprising:

a base portion having a top surface, a bottom surface, and a predetermined thickness therebetween, said bottom surface of said base portion being adapted to abut against said sheet material, a pair of mutually spaced apart clinch members integrally formed with said base portion, each of said clinch members having a top surface and a bottom surface, each of said clinch members further having an outer periphery defining at least two peripheral transition segment portions integral with said base portion, at least a portion of said bottom surface of each of said clinch members interposed said at least two peripheral transition segment portions being displaced from said bottom surface of said base portion such that at least a portion of said bottom surface of each of said clinch members is disposed above said bottom surface of said base portion to define a clinch opening between said at least two peripheral transition segment portions so that portions of said sheet material may be deformed into each said clinch opening in order to clinch said base portion of said fastener to said sheet material without severing or perforation said sheet material;

a tubular attachment portion integrally formed with said base portion and extending in a direction away from said top and bottom surfaces of said base portion, said tubular attachment portion further being interposed said clinch members; and threaded fastener means integrally formed with said tubular attachment portion, said threaded fastener means being adapted for attaching said separate threaded fastening device thereto.

11. The fastener as claimed in claim 10 wherein at least a portion of said bottom surface of each of said clinch members interposed said at least two peripheral transition segment portion. is displaced in a direction away from said top and bottom surfaces of said base portion such that at least a portion of said bottom surface of each of said clinch members is disposed above said top surface of said base portion to define an extrusion opening between said top surface of said base portion and said bottom surface said clinch members.

12. The fastener device as claimed in claim 11 wherein said displacement of said bottom surface of each of said clinch members above said top and bottom surfaces of said base portion is such that said sheet material may be extruded through said extrusion opening without severing or perforating said sheet material.

* * * * *

UNITED STATES PATENT AND TRADEMARK OFFICE
CERTIFICATE OF CORRECTION

PATENT NO. : 4,911,591

DATED : March 27, 1990

INVENTOR(S) : Daniel V. Oaks

It is certified that error appears in the above-identified patent and that said Letters Patent is hereby corrected as shown below:

Column 1, line 51, delete "to Pouch et al".

Column 1, line 52, after "Nos." insert ---- to Pouch et al ----.

Column 1, line 60, delete "a" and insert ---- an ----.

Column 2, line 4, after "deformed" insert ---- . ----.

Column 2, line 64, after "material" insert ---- . ----.

Column 3, line 60, delete "BEST MODE FOR CARRYING OUT THE".

Column 3, line 61, delete "INVENTION" and insert ---- DETAILED DESCRIPTION OF THE PREFERRED EMBODIMENT ----.

Column 5, line 57, delete "hose" and insert ---- base ----.

Column 5, line 68, after "second" insert ---- end ----.

Column 7, line 2, delete "based" and insert ---- base ----.

Column 8, line 7, delete "perforation" and insert ---- perforating ----.

Column 8, line 20, delete "portion." and insert ---- portions ----.

UNITED STATES PATENT AND TRADEMARK OFFICE
CERTIFICATE OF CORRECTION

PATENT NO. : 4,911,591

DATED : March 27, 1990

INVENTOR(S) : Daniel V. Oaks

It is certified that error appears in the above-identified patent and that said Letters Patent is hereby corrected as shown below:

Column 8, line 26, after "surface" insert ---- of ----.

Figures 5 and 11 should appear as shown on the attached sheet.

Signed and Sealed this

Thirteenth Day of August, 1991

Attest:

HARRY F. MANBECK, JR.

Attesting Officer

Commissioner of Patents and Trademarks

Fig. 5

Fig. 11